US011824632B2

(12) United States Patent
Elby et al.

(10) Patent No.: US 11,824,632 B2
(45) Date of Patent: Nov. 21, 2023

(54) SUBCARRIER BASED DATA CENTER NETWORK ARCHITECTURE

(71) Applicant: Infinera Corporation, San Jose, CA (US)

(72) Inventors: Stuart Elby, Chester, NJ (US); David F. Welch, Atherton, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/403,840

(22) Filed: Aug. 16, 2021

(65) Prior Publication Data

US 2022/0216935 A1 Jul. 7, 2022

Related U.S. Application Data

(63) Continuation of application No. 16/510,528, filed on Jul. 12, 2019, now Pat. No. 11,095,389.

(60) Provisional application No. 62/697,264, filed on Jul. 12, 2018.

(51) Int. Cl.
*H04J 14/02* (2006.01)
*H04B 10/50* (2013.01)
*H04B 10/61* (2013.01)

(52) U.S. Cl.
CPC ........ *H04J 14/0298* (2013.01); *H04B 10/506* (2013.01); *H04B 10/61* (2013.01)

(58) Field of Classification Search
CPC .... H04J 14/0298; H04B 10/506; H04B 10/61
See application file for complete search history.

(56) References Cited

U.S. PATENT DOCUMENTS

| 5,596,436 A * | 1/1997 | Sargis | H04J 14/0298 398/76 |
|---|---|---|---|
| 2010/0028002 A1* | 2/2010 | Qian | H04Q 11/0067 398/79 |
| 2014/0376930 A1* | 12/2014 | Shiba | H04B 10/691 398/212 |
| 2016/0057516 A1* | 2/2016 | Hochberg | H04J 14/02 398/139 |
| 2016/0233963 A1* | 8/2016 | Zhuge | H04B 10/516 |
| 2017/0054513 A1* | 2/2017 | Guo | H04B 10/6164 |

\* cited by examiner

*Primary Examiner* — Casey L Kretzer
(74) *Attorney, Agent, or Firm* — David L. Soltz

(57) ABSTRACT

Methods, systems, and apparatus, including computer programs encoded on computer storage media, for generating, transmitting, directing, receiving, and processing optical subcarriers. In some implementations, a system includes a Tier 1 switch that supplies a plurality of data channels; a transmitter that receives the plurality of data channels, the transmitter including an optical modulator that supplies a plurality of optical subcarriers based on the plurality of data channels; an optical platform that receives the plurality of optical subcarriers, the optical platform having a plurality of outputs, each of which supplying at least one of the plurality of subcarriers; a plurality of receivers, each receiving one or more of the plurality of optical subcarriers and supplying one or more of the plurality of data channels; and a plurality of servers, each of which receiving one or more of the plurality of data channels.

19 Claims, 11 Drawing Sheets

SUBCARRIER BASED DATA CENTER NETWORK ARCHITECTURE

CROSS REFERENCE TO RELATED APPLICATIONS

This application is a continuation of U.S. patent application Ser. No. 16/510,528, filed Jul. 12, 2019, which claims the benefit of U.S. Provisional Patent Application No. 62/697,264, filed Jul. 12, 2018, each of which is incorporated herein by reference in its entirety.

BACKGROUND

This specification relates generally to optical communication networks.

Many optical communication networks have a leaf-spine architecture, where a series of spine switches, i.e., Tier 1 switches, each connect to a series of underlying leaf switches, i.e., top-of-rack (TOR) switches, which form an access layer for individual servers.

SUMMARY

This specification describes techniques, methods, and systems for generating, transmitting, directing, receiving, and processing optical subcarriers. In some implementations, an optical transmitter in a primary transceiver sends optical subcarriers, via an optical platform, to optical receivers, each of which being in a corresponding one of a plurality of secondary transceivers. Each optical subcarrier may be associated with data designated for a corresponding server within an optical network. In some examples, the optical subcarriers may constitute a wavelength division multiplexed (WDM) optical signal.

In general, a subcarrier-based data center network architecture, as disclosed herein, includes a primary transceiver connected to Tier 1 switch. The primary transceiver transmits a composite carrier signal that may be logically subdivided into individual optical subcarriers corresponding to the capacities of the secondary transceivers. Each of the optical subcarriers may have a corresponding one of a plurality of frequencies or wavelengths. The optical subcarriers may be transmitted to an optical platform, which, in one example, may power split the received optical subcarriers and provide a power split portion of each subcarrier to a receiver in each of the secondary transceivers. In another example, the optical platform may wavelength of frequency demultiplex the received optical subcarriers, such that each output of the optical platform supplies a respective subcarrier to a receiver in a corresponding secondary transceiver. The receiver, in turn, may demodulate one or more of the received subcarriers and supply data associated with such subcarrier(s) to a corresponding data server.

As data centers include more sophisticated servers, e.g., graphics processing unit (GPU)-based servers for virtual reality and artificial intelligence applications, higher data rates are advantageous. GPU-based servers consume significantly more power than central processing unit (CPU)-based servers. As server capacities increase, the speeds of the network interface cards (NICs) of the servers must increase commensurately. For example, NIC speeds of 100 gigabits per second (Gb/s) may be necessary for supporting complex image and visual processing. As NIC speeds increase, the Tier 1 switch speeds must also increase, as each Tier 1 link may carry traffic from multiple NICs. For example, each Tier 1 link may carry traffic from 8, 16, 32, or 64 NICs.

A system with a typical leaf-spine architecture includes multiple servers that communicate with top-of-rack (TOR) switches, i.e. leaf switches, which in turn communicate with Tier 1 switches, i.e., spine switches. In a typical leaf-spine architecture, the TOR processes data packets to enable traffic aggregation and distribution in the upstream direction towards the Tier 1 switches, and to provide correct forwarding of the data packets to the appropriate NIC in the downstream direction towards the servers. TOR packet switches, however, consume significant power, and the power consumption scales up as port speeds scale up.

The system and techniques described herein can be used to replace the TOR within an optical communications system with an optical platform, including an optical splitter and an optical power combiner. Subcarrier based data center network architecture using an optical platform consumes less power, compared to a TOR, while at the same time enable higher data rates to be directed to the servers. Thus, the techniques disclosed herein may reduce the power and space required for optical communications systems, while enabling higher data rates.

In general, one innovative aspect of the subject matter described in this specification can be embodied in a system that includes a Tier 1 switch that supplies a plurality of data channels; a transmitter that receives the plurality of data channels, the transmitter including a laser, and an optical modulator that receives a plurality of radio frequency (RF) signals associated with the plurality of data channels, such that the optical modulator supplies a plurality of optical subcarriers based on the plurality of data channels; an optical platform, including one of an optical demultiplexer or a splitter, that receives the plurality of optical subcarriers, the optical platform having a plurality of outputs, each of which supplying at least one of the plurality of subcarriers; a plurality of receivers, each of which being coupled to a respective one of the plurality of outputs of the optical platform, each of the plurality of receivers receiving one or more of the plurality of optical subcarriers and supplying one or more of the plurality of data channels based on the received one or more of the plurality subcarriers; and a plurality of servers, each of which receiving one or more of the plurality of data channels from one or more of the plurality of receivers.

In general, one innovative aspect of the subject matter described in this specification can be embodied in a system that includes a plurality of servers, each of which supplying a corresponding one of a plurality of data channels; a plurality of transmitters, each of which receiving a corresponding one of the plurality of data channels, each of the plurality of transmitters providing a respective one of a plurality of optical carriers, each of the plurality of optical carriers being modulated in accordance with a respective one of a plurality of radio frequency (RF) signals, each RF signal being based on a respective one of the plurality of data channels; an optical platform that combines the plurality of optical carriers onto an optical fiber; a receiver that receives the combined plurality of optical carriers, the receiver including a local oscillator, such that based on plurality of optical carriers and an output of the local oscillator, the receiver supplies the plurality of data channels; and a Tier 1 switch that receives the plurality of data channels.

Particular implementations may include one or more of the following features, alone or in combination. The optical platform may include an optical demultiplexer that supplies a corresponding one or more of the plurality of subcarriers at each of the plurality of outputs. The optical platform may include an optical splitter that supplies a copy of the plurality of subcarriers at each of the plurality of outputs. Each of the plurality of optical subcarriers may be a Nyquist subcarrier. Each of the plurality of data channels supplied to the transmitter may constitute a respective one of a plurality of electrical signals. The Tier 1 switch may include a housing, the housing including the transmitter. Each of the plurality of optical subcarriers may be modulated in accordance with a modulation format, the modulation format being selected from an m-quadrature amplitude modulation (QAM), m being an integer, quadrature phase shift keying (QPSK), and binary phase shift keying (BPSK). Each of the plurality of receivers may include a respective one of a plurality of local oscillator lasers. One of the plurality of receivers may include a local oscillator laser; a control circuit, the control circuit being coupled to the local oscillator laser to thereby control a frequency of light output from the local oscillator laser; a photodetector circuit configured to receive at least a portion of the light output from the local oscillator laser and at least part of one of the plurality of outputs of the optical platform; and a processor circuit that supplies one of the plurality of data channels based on an output of the photodetector circuit. The processor may supplies said one of the plurality of data channels further based on a frequency of the light output from the local oscillator. Each of the plurality of receivers includes a corresponding one of a plurality of optical filters, each of the plurality of optical filters being configured to select a respective one of the plurality of optical subcarriers. The processor circuit includes a filter circuit, the processor circuit supplying said one of the plurality of data channels based on an output of the filter circuit.

In some implementations, the optical platform may include an optical power combiner. The optical platform may include an optical multiplexer. The optical platform may include an arrayed waveguide grating. The plurality of optical carriers may be included in a group of carriers provided to the receiver, the receiver including an optical filter that selects the plurality of optical carriers; and a photodetector circuit that converts the plurality of optical carriers to electrical signals. The local oscillator may be an electrical local oscillator, the plurality of data channels being output further based on an output of the electrical local oscillator and the electrical signals. Each of the plurality of optical carriers may be a Nyquist carrier. Each of the plurality of data channels may constitute a respective one of a plurality of electrical signals. The Tier 1 switch may include a housing, the housing including the receiver. Each of the plurality of optical carriers may be modulated in accordance with a modulation format, the modulation format being selected from an m-quadrature amplitude modulation (QAM), m being an integer, quadrature phase shift keying (QPSK), and binary phase shift keying (BPSK). The local oscillator may include a local oscillator laser.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Additional embodiments of this aspect include corresponding communications systems, apparatus, switches, and nodes, each configured to perform the actions of the methods. For example, a communications system of one or more switches can be configured to perform particular operations including processing and routing data traffic upstream and downstream within the communications system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Consistent with the present disclosure, a Tier 1 Switch supplies data to a high capacity transmitter that transmits a plurality of optical subcarriers to a passive optical platform. The optical platform may include a passive optical splitter that supplies a power split portion of the optical subcarriers to lower rate receivers. Each subcarrier may carry information indicative of data for output to a particular server. Accordingly, in one example, each receiver is coupled to a corresponding server and demodulates a designated one of the received subcarriers to thereby output data intended for such server. In another example, the optical platform wavelength or frequency demultiplexes the optical subcarriers received from the high capacity transmitter and supplies each subcarrier to a corresponding receiver, which, in a similar fashion demodulates the received subcarrier and supplies the resulting data to a respective server.

The passive optical platform may consume little or no power and, is therefore, less expensive to operate than a conventional TOR and does not require the cooling mechanisms that a TOR would otherwise require. Moreover, as described in greater detail below, optical subcarriers may be readily added by modulating the output of a laser in the high speed transmitter without adding additional lasers, for example. Accordingly, a system consistent with the present disclosure may be easily expanded.

Reference will now be made in detail to the present embodiments of the present disclosure, examples of which are illustrated in the accompanying drawings. Wherever possible, the same reference numbers will be used throughout the drawings to refer to the same or like parts.

Figure 1:
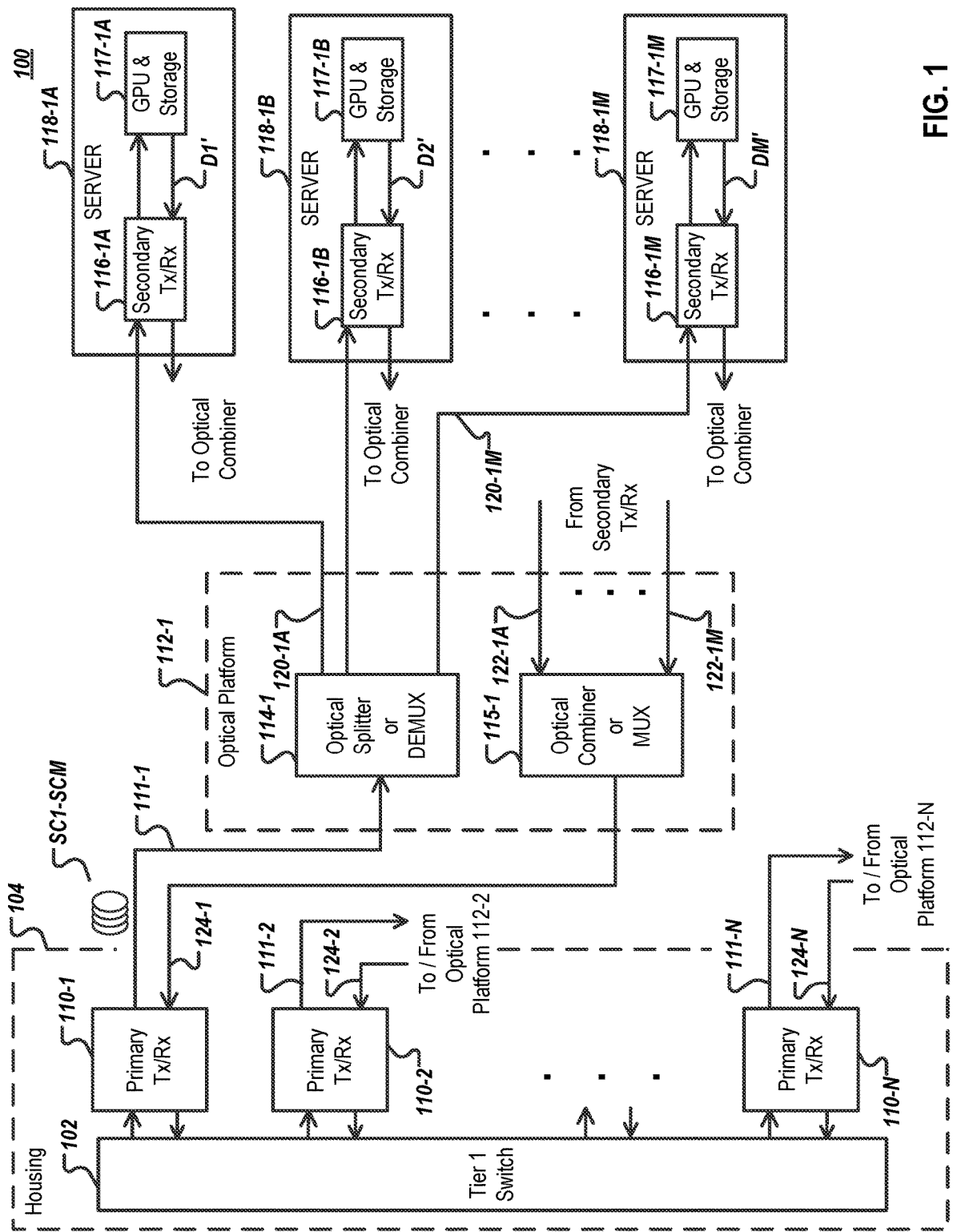
FIG. 1 is a block diagram that illustrates an example of a system for subcarrier based optical communication.

FIG. 1 is a block diagram that illustrates an example of a system 100 for subcarrier based optical communication. The system 100 includes a Tier 1 switch 102, a plurality of primary transceivers, a plurality of optical platforms, a plurality of secondary transceivers, and a plurality of servers. For example, the system 100 may include N number of primary transceivers 110-1 to 110-N, N number of optical platforms numbered 112-1 to 112-N, N×M number of secondary transceivers 116-1A to 116-NM, and N×M number of servers 118-1A to 118-NM, where M number of servers communicates with each of the N number of primary transceivers.

Communication through the system 100 can occur in both the downstream and upstream directions. In the downstream direction, data flows from the Tier 1 switch 102 to the servers 118-1A to 118-NM. In the upstream direction, data flows from the servers 118-1A to 118-NM to the Tier 1 switch 102.

The Tier 1 switch 102 can be, for example, a Tier 1 switch within an optical network. The Tier 1 switch 102 may include one or more routing modules, one or more uplink ports, and one or more input/output (I/O) ports. For example, the Tier 1 switch 102 may include N=8 I/O ports. The Tier 1 switch 102 can operate at high speeds, for example, 800 Gb/s.

The Tier 1 switch 102 manages the flow of data across a network, e.g., the system 100. In the downstream direction, the Tier 1 switch 102 may receive incoming data, e.g., a plurality of data channels D1 to DM, and direct or designate the data to a destination server. The plurality of data channels D1 to DM may constitute, for example, a plurality of electrical signals. In some examples, the Tier 1 switch 102 may receive incoming data from one or more network core switches through an uplink port, e.g., an Ethernet port. The Tier 1 switch 102 may examine the destination address of the incoming data and compare the address to a table of network addresses corresponding to the NICs of the servers within the optical network. The network addresses can be, for example, Internet Protocol (IP) addresses.

The Tier 1 switch 102 communicates with N number of primary transceivers numbered 110-1 to 110-N. The primary transceivers 110-1 to 110-N can each connect to the Tier 1 switch. In some examples, the Tier 1 switch 102 includes a housing 104, and the housing 104 houses the primary transceiver 110-1. The Tier 1 switch 102 dispatches the data to the appropriate primary transceivers 110-1 to 110-N.

A transmitter (described below) provided in each of the primary transceivers 110-1 to 110-N may generate a composite carrier signal 111-1 to 111-N at large bandwidths of M times the bandwidth of each of the servers 118-1A to 118-1M. As further described below, each composite carrier signal 111-1 to 111-N may include a plurality of optical subcarriers SC1 to SCM. For example, if the primary transceiver 110-1 communicates with M=8 servers, each server having a bandwidth of 100 Gigahertz (GHz), the primary transceiver 110-1 generates a composite carrier signal 111-1 at a bandwidth of 800 GHz. As a result of encoding by the transmitter, the information carried by each subcarrier SC1 to SCM is representative of a corresponding data channel D1 to DM.

The composite carrier signal 111-1 includes a plurality of optical subcarriers SC1 to SCM. Each subcarrier SC1 to SCM can carry information independently of the other subcarriers. Each subcarrier SC1 to SCM may have a bandwidth of 1/M times the bandwidth of the composite carrier signal 111-1. For example, the composite carrier signal 111-1 may have a bandwidth of 800 GHz, and may transmit to M=8 servers. Each subcarrier SC1-SC8 within the composite carrier signal 111-1 may therefore have a bandwidth of ⅛ times 800 GHz, or 100 GHz.

The primary transceivers 110-1 to 110-N can operate at M times the speed of the secondary transceivers 116-1A to 116-NM. For example, M=8 secondary transceivers 116-1A to 116-1H may each operate at a speed of 100 Gb/s. The primary transceiver 110-1 therefore may operate at a speed of 8 times 100 Gb/s, or 800 Gb/s.

The system 100 includes N number of optical platforms numbered 112-1 to 112-N. Each primary transceiver 110-1 to 110-N communicates with an optical platform 112-1 to 112-N via one or more optical fibers. For example, the primary transceiver 110-1 may communicate with the optical platform 112-1, and the primary transceiver 110-2 may communicate with the optical platform 112-2.

The primary transceiver 110-1 outputs the composite carrier signal 111-1, including the plurality of optical subcarriers SCM to SCM, onto an optical fiber. The composite carrier signal 111-1 transmits via the optical fiber to the optical platform 112-1.

The optical platform 112-1 receives the composite carrier signal 111-1, including the plurality of subcarriers SC1 to SCM, from the primary transceiver 110-1. The optical platform 112-1 may include one of an optical splitter or an optical demultiplexer (DEMUX) 114-1. The optical platform 112-1 also may include one of an optical power combiner or an optical power multiplexer (MUX) 115-1.

In the downstream direction, i.e., from the Tier 1 switch 102 to the servers 118-1A to 118-1M, the optical splitter 114-1 of the optical platform 112-1, for example, has an that receives composite signal 111-1 including the plurality of subcarriers SC1 to SCM from a transmitter in transceiver 110-1. For example, the optical splitter may split the composite carrier signal 111-1 into multiple power split portions (120-1A to 120-1M), each of which being provided at a respective output of the splitter 114-1. Accordingly, a power split portion or copy of each subcarrier is output from splitter 114-1. In some examples, each of the outputs 120-1A to 120-1M may have a power lower than the power of the composite carrier signal 111-1. For example, the power of each of the outputs may be 1/M times the power of the composite carrier signal 111-1. The optical splitter 114-1 outputs the same subcarriers that are input to the optical splitter 114-1, such that each of the outputs 120-1A to 120-1M may include each of the subcarriers SC1 to SCM. In another example, one or more optical amplifiers may be provided to increase the power of outputs of splitter 114-1.

In some examples, the optical platform 112-1 may include an optical demultiplexer instead of the optical splitter. The optical demultiplexer may supply one or more of the plurality of subcarriers SC1 to SCM at each of the plurality of outputs. For example, each of the outputs of the demultiplexer may include a group of subcarriers selected from the subcarriers SC1 to SCM, or may include a corresponding one of the subcarriers SC1 to SCM. The optical demultiplexer may include a wavelength selective switch (WSS), a reconfigurable optical add-drop multiplexer (ROADM), or a passive demultiplexer. For example, each of the plurality of subcarriers may be spectrally spaced to allow a WSS to select specific subcarriers for supplying at specific outputs.

Each optical platform 112-1 to 112-N may communicate with M number of secondary transceivers. For example, optical platform 112-1 may communicate with secondary transceivers 116-1A to 116-1M, and optical platform 112-2 may communicate with secondary transceivers 116-2A to 116-2M.

The optical platform 112-1 to 112-N can be used in a leaf-spine architecture as a replacement for a TOR and, therefore, consume less power than a convention systems, as noted above.

In the downstream direction, the optical platform 112-1 directs, to a plurality of receivers, each within a secondary transceiver 116-1A to 116-1M, one of the outputs 120-1A to 120-1M via optical fibers. A receiver in each secondary transceivers 116-1A to 116-1M each may filter, or isolate, the single subcarrier SC1 to SCM associated with a corresponding server 118-1A to 118-1M.

Each secondary transceiver 116-1A to 116-1M connects with a corresponding one of servers 118-1A to 118-1M. For example, the secondary transceiver 116-1A may connect with the server 118-1A, and the secondary transceiver 116-1B may connect with the server 118-1B. The secondary transceivers 116-1A to 116-1M output the data from a respective one of outputs 120-1A to 120-1M to a corresponding one of the plurality of servers 118-1A to 118-1M.

In some implementations, the server 118-1A may include the secondary transceiver 116-1A, and a GPU and storage module 117-1A. For example, the server 118-1A may include a housing, where the housing houses the secondary transceiver 116-1A and/or the GPU and storage module 117-1A. The storage may hold data and instructions that are entered through the secondary transceiver 116-1A, before they are processed by the GPU. The storage may also save the data for later use. The GPU includes a control unit and an arithmetic logic unit (ALU), and directs the activities of the server 118-1A. In the downstream direction, the GPU processes the data from the subcarrier associated with the server 118-1A, and carries out instructions to the server 118-1A.

In the upstream direction, i.e., from the servers 118-1A to 118-1M to the Tier 1 switch 102, the GPU generates data and may send data to the storage. A transmitter in the secondary transceiver 116-1A may receive the data from the storage and process the data for transmission to upstream components of the optical network. The data may include, for example, a corresponding one of a plurality of data channels D1' to DM'. The plurality of data channels D1' to DM' may constitute, for example, a plurality of electrical signals. Each transmitter in the secondary transceivers 116 may output, in one example, an optical signal, such as an optical subcarrier or carrier having a frequency that is the same as or similar to that of the received subcarrier. Moreover, each upstream optical subcarrier is associated with a corresponding one of data channels D1' to DM'.

In the upstream direction, the optical power combiner 115-1 of the optical platform 112-1 can receive carrier signals, e.g., the carrier signals 122-1A to 122-1M, from a plurality of transmitters, each within a secondary transceiver 116-1A to 116-1M. The optical power combiner 115-1 may combine the multiple carrier signals 122-1A to 122-1M into a combined plurality of optical carriers 124-1 for forwarding to the Tier 1 switch 102.

In some examples, the optical platform 112-1 may include an optical multiplexer instead of an optical combiner. The optical multiplexer may receive one or more of a plurality of carriers at each of a plurality of inputs. For example, each of the inputs to the multiplexer may include a group of carriers or a single carrier. The optical multiplexer may include, for example, an arrayed waveguide grating. The arrayed waveguide grating may include waveguides with various path lengths that cause constructive interference between the carrier signals 122-1A to 122-1M. Thus, the arrayed waveguide grating may be used to combine the carrier signals 122-1A to 122-1M onto an optical fiber.

While FIG. 1 shows the system 100 as including a particular quantity and arrangement of components, in some implementations, the system 100 may include additional components, fewer components, different components, or differently arranged components. For example, the quantity of primary transceivers 110-1 to 110-N, and secondary transceivers 116-1A to 116-NM, may vary based on the requirements of the system 100. In some instances, each primary transceiver may communicate with a different number of servers. For example, primary transceiver 110-1 may communicate with M number of servers, while primary transceiver 110-2 may communicate with P number of servers. In some instances, one of the components illustrated in FIG. 1 may carry out a function described herein as being carried out by another one of the components illustrated in FIG. 1.

Figure 2:
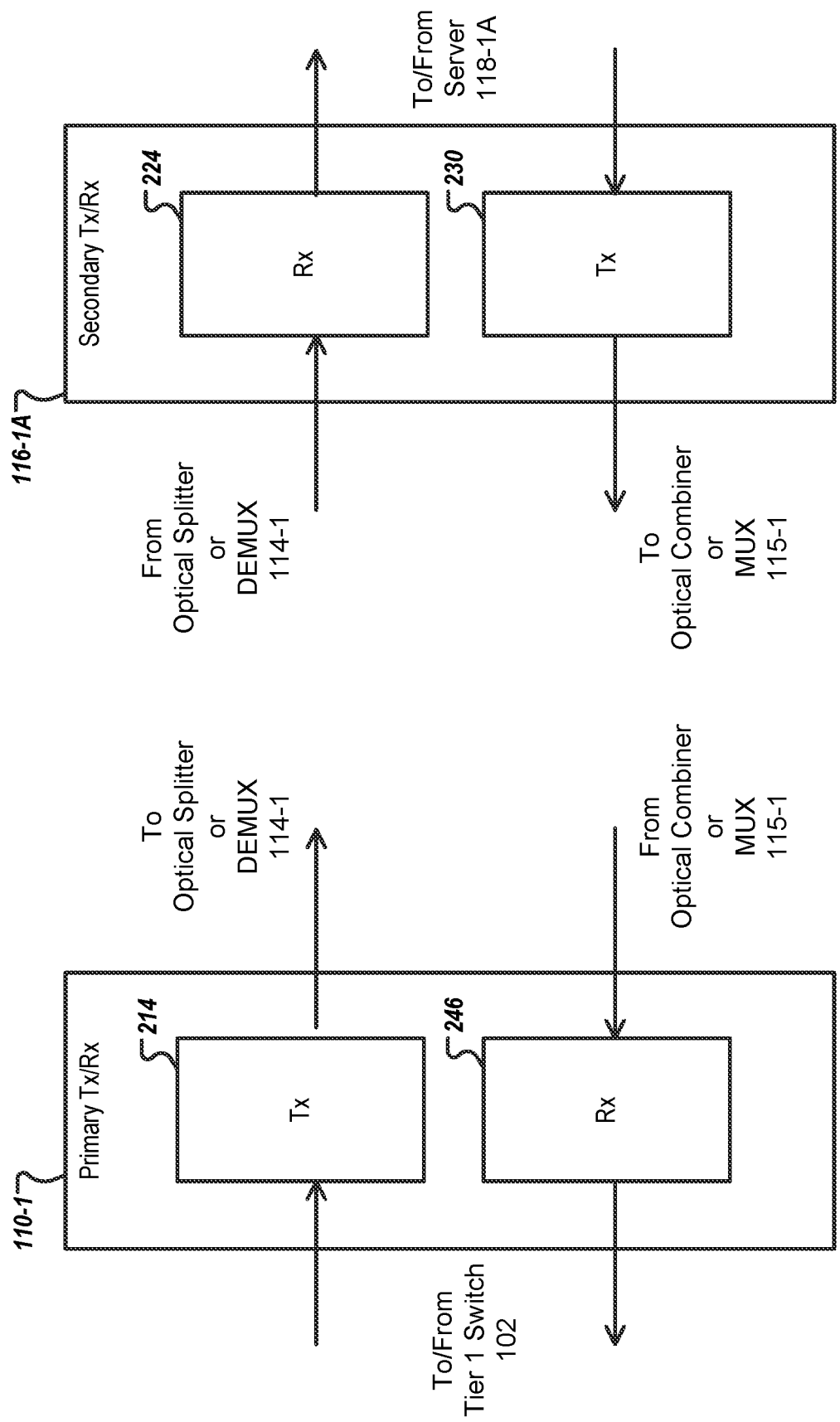
FIG. 2 is a block diagram that illustrates example primary transceivers and secondary transceivers.

FIG. 2 is a block diagram that illustrates an example primary transceiver and secondary transceiver. For example, FIG. 2 illustrates a more detailed depiction of the primary transceiver 110-1, and the secondary transceiver 116-1, from FIG. 1. As shown in FIG. 1, a system, e.g., the system 100, may include N number of primary transceivers and N×M number of secondary transceivers. Each of the N number of primary transceivers may include a transmitter 214 and a receiver 246. Each of the N×M number of secondary transceivers may include a transmitter 230 and a receiver 224.

In some examples, the primary transceiver 110-1 is an external device that plugs into the I/O ports of the Tier 1 switch 102. For example, the primary transceiver 110-1 can be packaged in industry standard pluggable form factors, e.g., small form-factor pluggable (SFP) or C form-factor pluggable (CFP) transceivers.

In some examples, the primary transceiver 110-1 is built into the Tier 1 switch 102. For example, the primary transceiver 110-1 can be integrated directly with the motherboard or daughter card of the Tier 1 switch 102. In some examples, the Tier 1 switch 102 includes a housing, e.g., the housing 104, and the housing 104 houses the primary transceiver 110-1.

The primary transceiver 110-1 includes a transmitter 214 and a receiver 246. In the downstream direction, the transmitter 214 receives data channels through the I/O port of the Tier 1 switch 102. The transmitter 214 multiplexes, or combines, the data into a multiplexed optical signal 111-1 for transmission to the destination servers via the passive optical splitter 114-1 of the optical platform 112-1.

In the upstream direction, the receiver 246 of the primary transceiver 110-1 may receive the combined plurality of optical carriers 124-1 from the optical power combiner 115-1 of the optical platform 112-1. The receiver 246 outputs the data channels to the Tier 1 switch 102 through an I/O port. Receiver 246 is described in greater detail below.

In some examples, the secondary transceiver 116-1A is an external device that plugs into the server 118-1A. For example, the secondary transceiver 116-1A can be packaged in industry standard pluggable form factor, e.g., a small form-factor pluggable (SFP) or C form-factor pluggable (CFP) transceiver.

In some examples, the secondary transceiver 116-1A is built into the server 118-1A. For example, the secondary transceiver 116-1A can be integrated directly with the motherboard or daughter card of the server 118-1A. In some examples, the server 118-1A includes a housing, and the housing houses the secondary transceiver 116-1A.

The secondary transceiver 116-1A includes a transmitter 230 and a receiver 224. Each of the receivers 224 within each of the secondary transceivers 116-1A to 116-1M is coupled to a respective one of the plurality of outputs 120-1A to 120-1M of the optical platform 112-1.

In the downstream direction, the secondary transceiver 116-1A receives the output 120-1A from the splitter 114-1 of the optical platform 112-1. The receiver 224 receives the output 120-1A, which includes the plurality of optical subcarriers SC1 to SCM, and isolates the specific subcarrier of the output 120-1A that is associated with the server 118-1A. The receiver 224 of the secondary transceiver 116-1A demodulates and decodes the output 120-1A into a digital data format for processing by the server 118-1A.

The receiver 224 supplies to a corresponding server one or more of the plurality of data channels D1 to DM based on the received plurality of subcarriers SC1 to SCM. For example, the receiver 224 may demodulate and process optical subcarrier SC1 to supply the data channel D1 associated with subcarrier SC1 to the server 118-1A. Each of the servers 118-1A to 118-1M receives one or more of the plurality of data channels from one or more of the plurality of receivers. For example, the server 118-1A may receive the data channel D1 from the receiver 224 of the transceiver 116-1A.

In the upstream direction, a plurality of servers supplies a corresponding one of a plurality of data channels. Each of the plurality of transmitters receives a corresponding one of the plurality of data channels. For example, the transmitter 230 of the secondary transceiver 116-1A receives the data D1' from the server 118-1A and transmits a subcarrier or carrier that carries information indicative of data D1', via an optical fiber, to combiner 115-1, which combines the received carrier from transmitter 230 with carriers or subcarriers carrying a respective one of data D2' to DM' output from transmitters of the other secondary transceivers 116 and supplies such combined carriers or subcarriers to receiver 246 of primary node 110-1.

Figure 3:
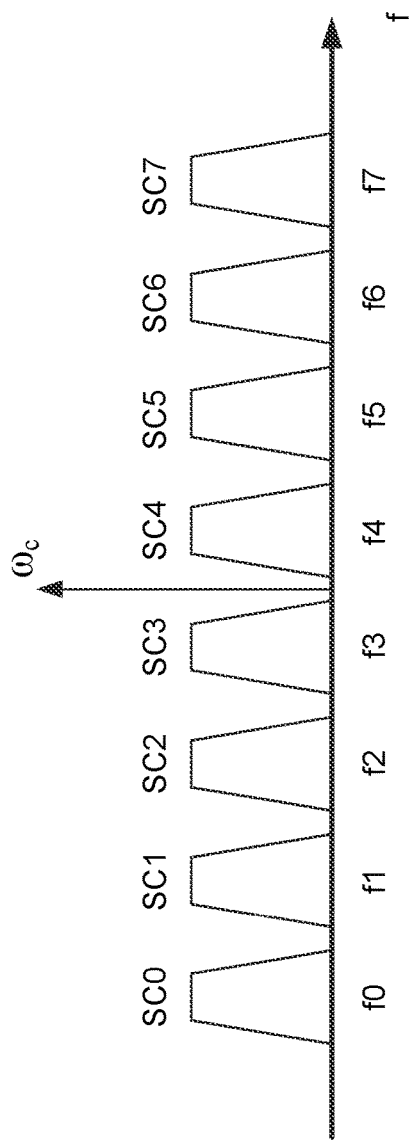
FIG. 3 illustrates an example of a composite carrier signal.

FIG. 3 illustrates an example of a composite carrier signal 300. The composite carrier signal may be, for example, the composite carrier signal 111-1 and/or the outputs 120-1A to 120-1M. The composite carrier signal 300 includes M=8 optical subcarriers SC0 to SC7. The composite carrier signal 300 is graphed in the frequency spectrum. The subcarriers may be, for example, Nyquist subcarriers. The center frequency of each of subcarriers SC0 to SC7 is f0 to f7, respectively, such that f0 is the center frequency of SC0, f1 is the center frequency of SC1, etc. The center frequency of the composite carrier signal is $\omega_c$, which corresponds to the frequency of light output from a laser in transmitter 214 prior to modulation. Each subcarrier may carry information indicative of data for output to a particular server. For example, subcarrier SC0 may carry information indicative of data channel D0.

Figure 4:
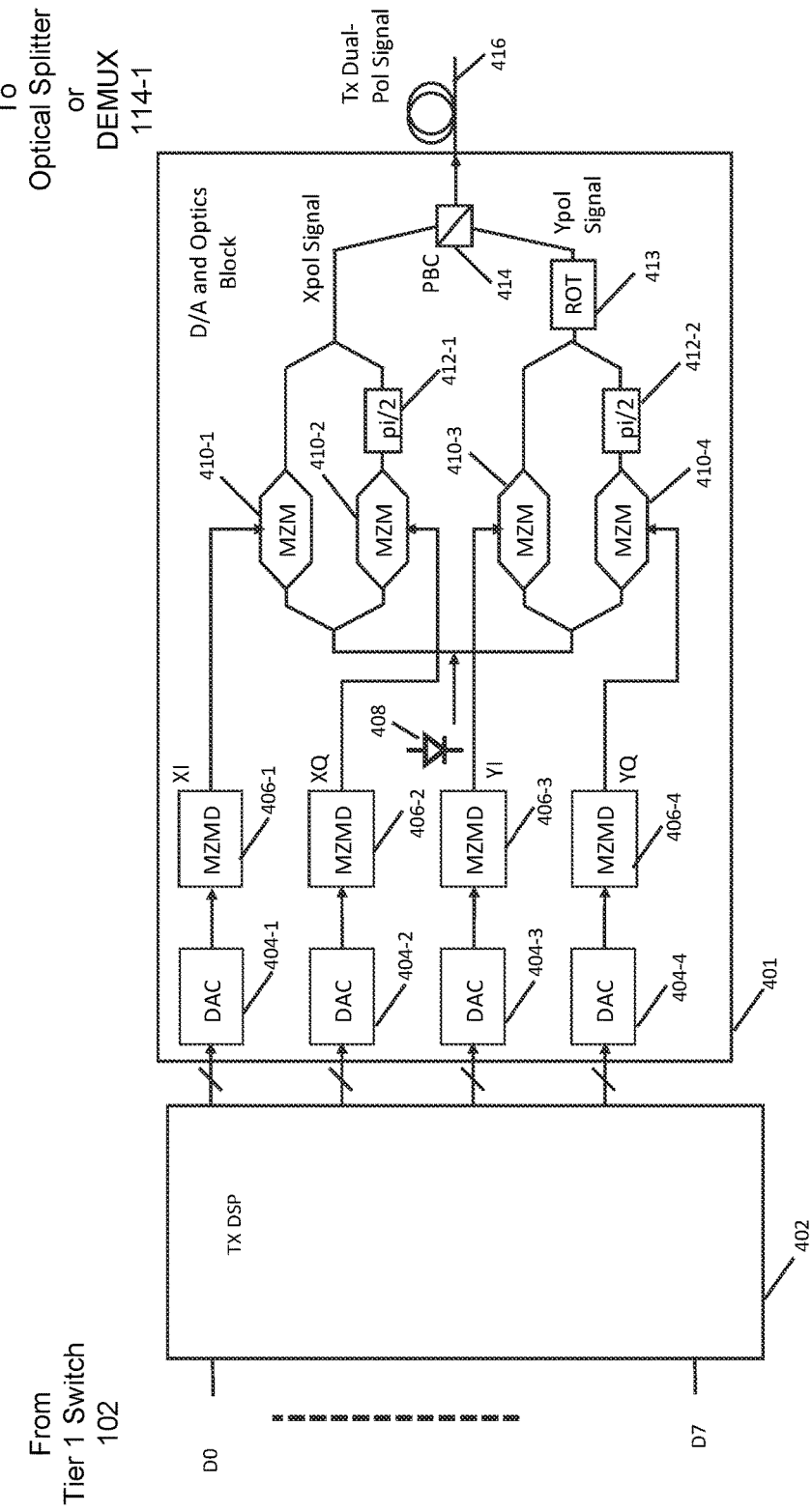
FIG. 4 illustrates an example of a transmitter of a primary transceiver.

FIG. 4 illustrates an example of a transmitter 214 of a primary transceiver 110-1 consistent with the present disclosure. The transmitter 214 in this example is configured to provide data to M=8 servers by a modulated optical signal with 8 subcarriers. The transmitter 214 may include a digital signal processor (DSP) 402, which, in this example, receives a plurality of data inputs D0-D7. It is understood, however, that DSP 402 may receive more or fewer inputs. Based on data inputs D0-D7, DSP 402 may supply a plurality of outputs to D/A and optics block 401 including digital-to-analog conversion (DAC) circuits 404-1 to 404-4, which convert digital signal received from DSP 402 into corresponding analog radio frequency (RF) signals. D/A and optics block 401 may also include driver circuits 406-1 to 406-2 that receive the plurality of RF signals from DACs 404-1 to 404-4 and adjust the voltages or other characteristics thereof to provide drive signals to a corresponding one of optical modulators 410-1 to 410-4.

D/A and optics block 401 further includes optical modulators 410-1 to 410-4, each of which may be a Mach-Zehnder modulator (MZM) that modulates the phase and/or amplitude of the light output from laser 408. As further shown in FIG. 4, light output from laser 408, also included in block 401 is split, such that a first portion of the light is supplied to a first MZM pairing including MZMs 410-1 and 410-2, and a second portion of the light is supplied to a second MZM pairing including MZMs 410-3 and 410-4. The first portion of the light is further split into third and fourth portions, such that the third portion is modulated by MZM 410-1 to provide an in-phase (I) component of an X (or TE) polarization component of a modulated optical signal, and the fourth portion is modulated by MZM 410-2 and fed to phase shifter 412-1 to shift the phase of such light by 90 degrees in order to provide a quadrature (Q) component of an X polarization component of the modulated optical signal. Similarly, the second portion of the light is further split into fifth and sixth portions, such that the fifth portion is modulated by MZM 410-3 to provide an I component of a Y (or TM) polarization component of the modulated optical signal, and the sixth portion is modulated by MZM 410-4 and fed to phase shifter 412-2 to shift the phase of such light by 90 degrees to provide a Q component of a Y polarization component of the modulated optical signal.

The optical outputs of MZMs 410-1 and 410-2 are combined to provide an X polarized optical signal including I and Q components and fed to a polarization beam combiner (PBC) 414 provided in block 401. In addition, the outputs of MZMs 410-3 and 410-4 are combined to provide an optical signal that is fed to polarization rotator 413, further provided in block 401, which rotates the polarization of such optical signal to provide a modulated optical signal having a Y (or TM) polarization. The Y polarized modulated optical signal is also provided to PBC 414, which combines the X and Y polarized modulated optical signals to provide a polarization multiplexed ("dual-pol") modulated optical signal onto optical fiber 416, for example, which may be included as a segment of optical fiber in optical communication path 111.

The polarization multiplexed optical signal output from D/A and optics block 401 includes subcarriers SC0-SC7, for example, such that each subcarrier has X and Y polarization components and I and Q components.

Figure 5:
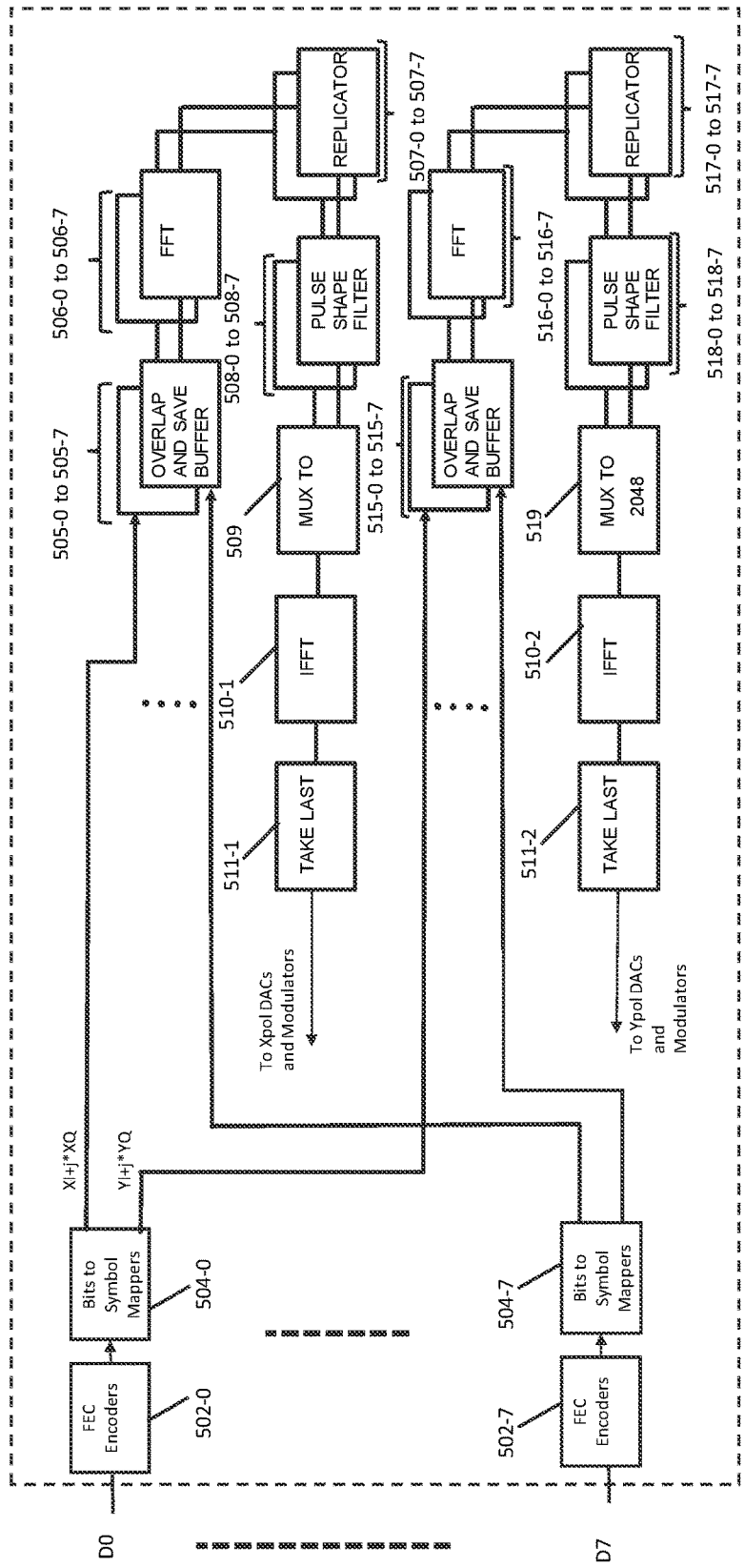
FIG. 5 illustrates an example of a transmitter digital signal processor.

FIG. 5 shows an example of a transmitter (TX) DSP 402 in greater detail. TX DSP 402 may include FEC encoders 502-0 to 502-7, each of which may receive a respective one of a plurality of data input D0 to D7. FEC encoders 502-0 to 502-7 carry out forward error correction coding on a corresponding one of the switch outputs, such as, by adding parity bits to the received data. FEC encoders 502-0 to 502-7 may also provide timing skew between the subcarriers to correct for skew introduced during transmission over one or more optical fibers. In addition, FEC encoders 502-0 to 502-7 may interleave the received data.

Each of FEC encoders 502-0 to 502-7 provides an output to a corresponding one of a plurality of bits-to-symbol circuits, 504-0 to 504-7 (collectively referred to herein as "504"). Each of bits to symbol circuits 504 may map the encoded bits to symbols on a complex plane. For example, bits to symbol circuits 504 may map four bits to a symbol in a dual-polarization quadrature phase shift keying (QPSK) constellation, or may map two bits to a symbol in a binary phase shift keying (BPSK) constellation. Each of bits to symbol circuits 504 provides first symbols, having the complex representation XI+j*XQ, associated with a respective one of the data input, such as D0, to DSP portion 503. Data indicative of such first symbols may carried by the X polarization component of each subcarrier SC0-SC7.

Each of bits to symbol circuits 504 may further provide second symbols having the complex representation YI+j*YQ, also associated with a corresponding one of data inputs D0 to D7. Data indicative of such second symbols, however, is carried by the Y polarization component of each of subcarriers SC-0 to SC-7.

As further shown in FIG. 5, each of the first symbols output from each of bits to symbol circuits 504 is supplied to a respective one of first overlap and save buffers 505-0 to 505-7 (collectively referred to herein as overlap and save buffers 505) that may buffer 256 symbols, for example. Each of overlap and save buffers 505 may receive 128 of the first symbols or another number of such symbols at a time from a corresponding one of bits to symbol circuits 504. Thus, overlap and save buffers 505 may combine 128 new symbols from bits to symbol circuits 505, with the previous 128 symbols received from bits to symbol circuits 505.

Each overlap and save buffer 505 supplies an output, which is in the time domain, to a corresponding one of fast Fourier Transform (FFT) circuits 506-0 to 506-7 (collectively referred to as "FFTs 506"). In one example, the output includes 256 symbols or another number of symbols. Each of FFTs 506 converts the received symbols to the frequency domain using or based on, for example, a fast Fourier transform. Each of FFTs 506 may include 256 memories or registers, also referred to as frequency bins or points, that store frequency components associated with the input symbols. Each of replicator components 507-0 to 507-7 may replicate the 256 frequency components associated with of FFTs 506 and store such components in 512 or another number of frequency bins (e.g., for T/2 based filtering of the subcarrier) in a respective one of the plurality of replicator components. Such replication may increase the sample rate. In addition, replicator components or circuits 507-0 to 507-7 may arrange or align the contents of the frequency bins to fall within the bandwidths associated with pulse shaped filter circuits 508-0 to 508-7 described below.

Each of pulse shape filter circuits 508-0 to 508-7 may apply a pulse shaping filter to the data stored in the 512 frequency bins of a respective one of the plurality of replicator components 507-0 to 507-7 to thereby provide a respective one of a plurality of filtered outputs, which are multiplexed and subject to an inverse FFT, as described below. Pulse shape filter circuits 508-1 to 508-7 calculate the transitions between the symbols and the desired subcarrier spectrum so that the subcarriers can be spectrally packed together for transmission, e.g., with a close frequency separation. Pulse shape filter circuits 508-0 to 508-7 may also be used to introduce timing skew between the subcarriers to correct for timing skew induced by links between nodes shown in FIG. 1, for example. Multiplexer component 509, which may include a multiplexer circuit or memory, may receive the filtered outputs from pulse shape filter circuits 508-0 to 508-7, and multiplex or combine such outputs together to form an element vector.

Next, IFFT circuit or component 510-1 may receive the element vector and provide a corresponding time domain signal or data based on an inverse fast Fourier transform (IFFT). In one example, the time domain signal may have a rate of 64 gigasamples per second (GSample/s). Take last buffer or memory circuit 511-1 may select the last 524 or another number of samples from an output of IFFT component or circuit 510-1 and supply the samples to DACs 404-1 and 404-2 at 64 GSample/s, for example. As noted above, DAC 404-1 is associated with the in-phase (I) component of the X pol signal and DAC 404-2 is associated with the quadrature (Q) component of the Y pol signal. Accordingly, consistent with the complex representation XI+jXQ, DAC 404-1 receives values associated with XI and DAC 404-2 receives values associated with jXQ. Based on these inputs, DACs 404-1 and 404-2 provide analog outputs to MZMD 406-1 and MZMD 406-2, respectively, as discussed above.

As further shown in FIG. 5, each of bits to symbol circuits 504-0 to 504-7 outputs a corresponding one of symbols indicative of data carried by the Y polarization component of the polarization multiplexed modulated optical signal output on an optical fiber. As further noted above, these symbols may have the complex representation YI+j*YQ. Each such symbol may be processed by a respective one of overlap and save buffers 515-0 to 515-7, a respective one of FFT circuits 516-0 to 516-7, a respective one of replicator components or circuits 517-0 to 517-7, pulse shape filter circuits 518-0 to 518-7, multiplexer or memory 519, IFFT 510-2, and take last buffer or memory circuit 511-2, to provide processed symbols having the representation YI+j*YQ in a manner similar to or the same as that discussed above in generating processed symbols XI+j*XQ output from take last circuit 511-1. In addition, symbol components YI and YQ are provided to DACs 404-3 and 404-4, respectively. Based on these inputs, DACs 404-3 and 404-4 provide analog outputs to MZMD 406-3 and MZMD 406-4, respectively, as discussed above.

While FIG. 5 shows DSP 402 as including a particular quantity and arrangement of functional components, in some implementations, DSP 402 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits.

Figure 6:
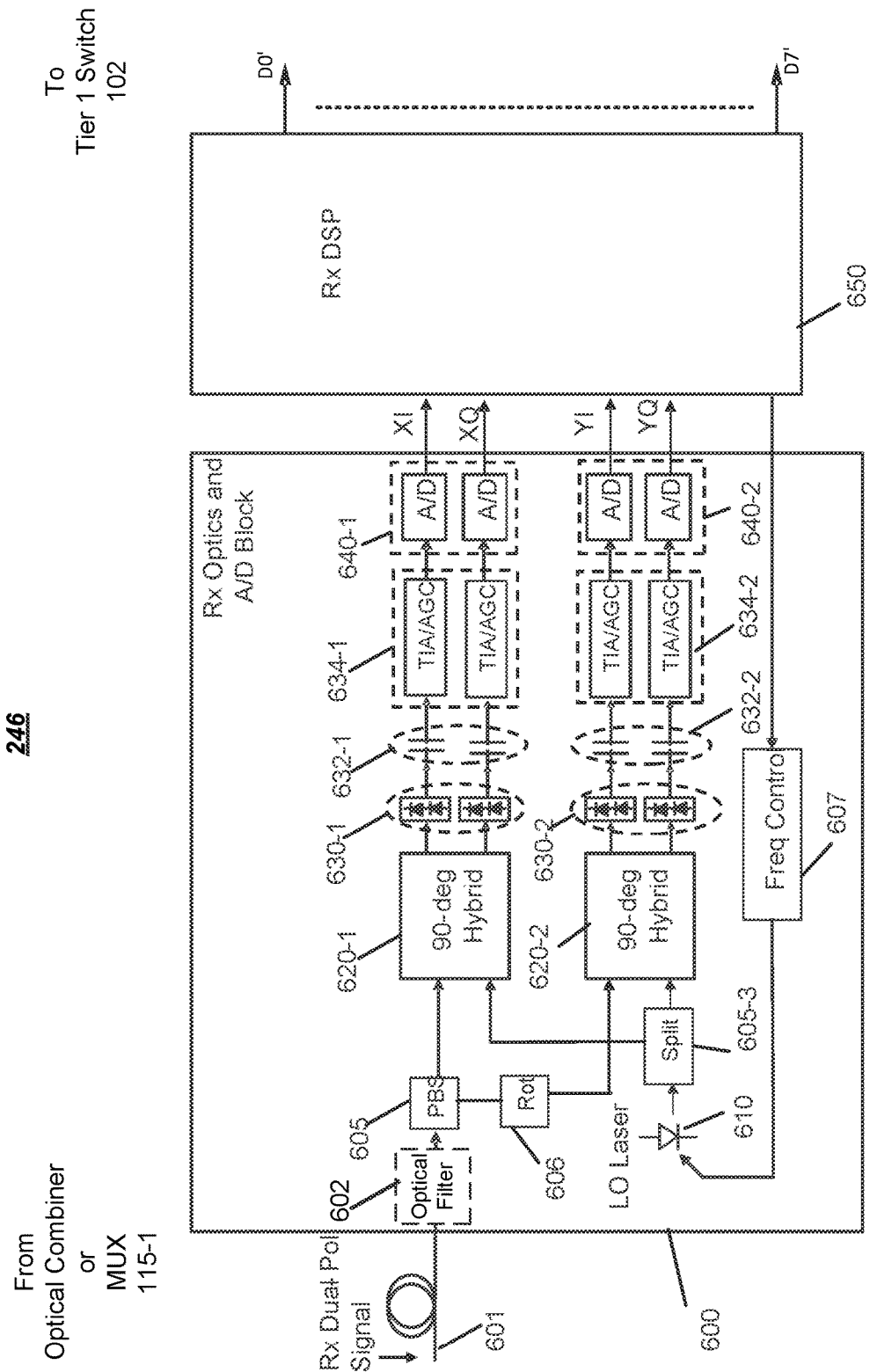
FIG. 6 illustrates an example of a receiver of a primary transceiver.

FIG. 6 illustrates an example of a receiver 246 of a primary transceiver 110-1 consistent with the present disclosure.

The receiver 246 in this example is configured to receive data from M=8 servers by a composite carrier signal that includes 8 optical carriers. As shown in FIG. 6, optical receiver 246 may include a receiver (RX) optics and A/D block 600. Optical receiver 246 may also include a processor circuit, e.g., RX DSP 650, which, in conjunction with the RX optics and A/D block 600, may carry out coherent detection. Block 600 may include a polarization splitter 605 with first (605-1) and second (605-2) outputs), a frequency control circuit 607, one of a plurality of local oscillator (LO) lasers 610, 90 degree optical hybrids or mixers 620-1 and 620-2 (referred to generally as hybrid mixers 620 and individually as hybrid mixer 620), detectors 630-1 and 630-2 (referred to generally as detectors 630 and individually as detector 630, each including either a single photodiode or balanced photodiode), AC coupling capacitors 632-1 and 632-2, transimpedance amplifiers/automatic gain control circuits TIA/AGC 634-1 and 634-2, ADCs 640-1 and 640-2 (referred to generally as ADCs 640 and individually as ADC 640), and an RX DSP 650.

Polarization beam splitter (PBS) 605 may include a polarization splitter that receives an input polarization combined plurality of optical carriers supplied by optical fiber link 601, which may be, for example, an optical fiber segment as part of one of an optical communication path. PBS 605 may split the incoming optical signal into the two X and Y orthogonal polarization components. The Y component may be supplied to a polarization rotator 606 that rotates the polarization of the Y component to have the X polarization. Hybrid mixers 620 may combine the X and rotated Y polarization components with light from local oscillator laser 610. For example, hybrid mixer 620-1 may combine a first polarization signal (e.g., the component of the incoming optical signal having a first or X (TE) polarization output from PBS port 605-1) with light from local oscillator 610, and hybrid mixer 620-2 may combine the rotated polarization signal (e.g., the component of the incoming optical signal having a second or Y (TM) polarization output from PBS port 605-2) with the light from local oscillator 610. In one example, polarization rotator 690 may be provided at PBS output 605-2 to rotate Y component polarization to have the X polarization.

In some examples, the local oscillator 610 may be a semiconductor laser, which may be tuned thermally or through current adjustment. If thermally tuned, the temperature of the local oscillator laser 610 is controlled with a thin film heater, for example, provided adjacent the local oscillator laser. The local oscillator 610 may be an electrical local oscillator. The RX optics and A/D block 600 may include a frequency control circuit 607 for controlling the local oscillator 610. The frequency control circuit 607 may be coupled to the local oscillator laser 610 to control the frequency of light output from the local oscillator laser 610. The current supplied to the laser may be controlled, if the local oscillator laser is current tuned. The local oscillator laser 610 may be a semiconductor laser, such as a distributed feedback laser or a distributed Bragg reflector laser.

The RX optics and A/D block 600 may include a photodetector circuit that may include the detectors 630, capacitors 632, TIA/AGCs 634, and ADCs 640. The photodetector circuit may receive a portion of the light output from the local oscillator laser 610 and a portion of the combined plurality of optical carriers. The photodetector circuit may convert the plurality of optical carriers to electrical signals. Detectors 630 may detect mixing products output from the optical hybrids, to form corresponding voltage signals, which are subject to AC coupling by capacitors 632-1 and 632-2, as well as amplification and gain control by TIA/AGCs 634-1 and 634-2. The outputs of TIA/AGCs 634-1 and 634-2 and ADCs 640 may convert the voltage signals to digital samples. For example, two detectors or photodiodes 630-1 may detect the X polarization signals to form the corresponding voltage signals, and a corresponding two ADCs 640-1 may convert the voltage signals to digital samples for the first polarization signals after amplification, gain control and AC coupling. Similarly, two detectors 630-2 may detect the rotated Y polarization signals to form the corresponding voltage signals, and a corresponding two ADCs 640-2 may convert the voltage signals to digital samples for the second polarization signals after amplification, gain control and AC coupling.

The processor circuit, e.g., RX DSP 650, may supply the plurality of data channels based on an output of the local oscillator 610 and the electrical signals from the photodetector circuit. For example, RX DSP 650 may process the electrical signals from the photodetector circuit and the electrical local oscillator output to supply data channels D0 to D7 to the Tier 1 switch 102.

In some examples, the optics and A/D block 600 can include one of a plurality of optical filters 602. The optical filter 602 may select a respective plurality of carriers from a group of carriers provided to the receiver 246. For example, the optical filter 602 may isolate the plurality of carriers by allowing the portion of the group of carriers that is within a specified frequency range of the plurality of carriers to pass through the optical filter 602, while reflecting the other portions of the group of carriers.

While FIG. 6 shows optical receiver 246 as including a particular quantity and arrangement of components, in some implementations, optical receiver 246 may include additional components, fewer components, different components, or differently arranged components. The quantity of detectors 630 and/or ADCs 640 may be selected to implement an optical receiver 302 that is capable of receiving a polarization multiplexed signal. In some instances, one of the components illustrated in FIG. 6 may carry out a function described herein as being carry outed by another one of the components illustrated in FIG. 6.

Figure 7:
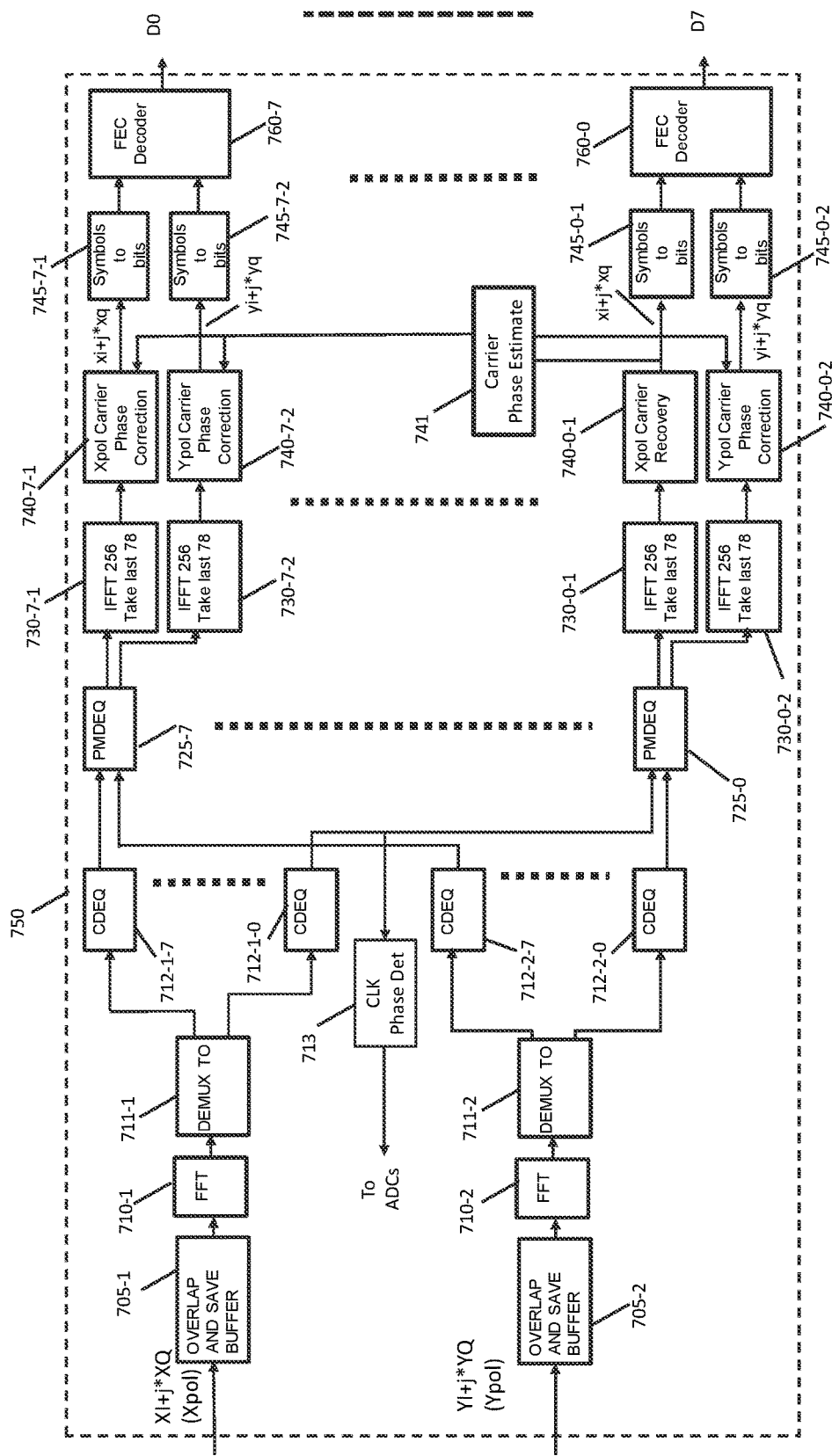
FIG. 7 illustrates an example of a receiver digital signal processor.

FIG. 7 illustrates exemplary components of receiver digital signal processor (DSP) 650. As noted above, analog-to-digital (A/D) circuits 640-1 and 640-2 output digital samples corresponding to the analog inputs supplied thereto. In one example, the samples may be supplied by each A/D circuit at a rate of 64 GSamples/s. The digital samples correspond to symbols carried by the X polarization of the optical subcarriers and may be represented by the complex number XI+jXQ. The digital samples may be provided to overlap and save buffer 705-1, as shown in FIG. 7. FFT component or circuit 710-1 may receive the 2048 vector elements, for example, from the overlap and save buffer 705-1 and convert the vector elements to the frequency domain using, for example, a fast Fourier transform (FFT). The FFT component 710-1 may convert the 2048 vector elements to 2048 frequency components, each of which may be stored in a register or "bin" or other memory, as a result of carry outing the FFT.

The frequency components may then then be demultiplexed, and groups of such components may be supplied to a respective one of chromatic dispersion equalizer circuits CDEQ 712-1-0 to 712-1-7, each of which may include a finite impulse response (FIR) filter that corrects, offsets or reduces the effects of, or errors associated with chromatic dispersion of the transmitted optical subcarriers. Each of CDEQ circuits 712-1-0 to 712-1-7 supplies an output to a corresponding polarization mode dispersion (PMD) equalizer circuit 725-0 to 725-7.

It is noted that digital samples output from A/D circuits 640-2 associated with Y polarization components of each subcarrier may be processed in a similar manner to that of digital samples output from A/D circuits 740-1 and associated with the X polarization component of each subcarrier. Namely, overlap and save buffer 705-2, FFT 710-2 and CDEQ circuits 712-2-0 to 712-2-7 may have a similar structure and operate in a similar fashion as buffer 705-1, FFT 710-1 and CDEQ circuits 712-1-0 to 712-1-7, respectively. For example, each of CDEQ circuits 712-2-0 to 712-7 may include an FIR filter that corrects, offsets, or reduces the effects of, or errors associated with chromatic dispersion of the transmitted optical subcarriers. In addition, each of CDEQ circuits 712-2-0 to 712-2-7 provide an output to a corresponding one of PMDEQ 725-0 to 725-7.

As further shown in FIG. 7, the output of one of the CDEQ circuits, such as CDEQ 712-1-0 may be supplied to clock phase detector circuit 713 to determine a clock phase or clock timing associated with the received subcarriers. Such phase or timing information or data may be supplied to ADCs 640-1 and 640-2 to adjust or control the timing of the digital samples output from ADCs 640-1 and 640-2.

Each of PMDEQ circuits 725 may include another FIR filter that corrects, offsets or reduces the effects of, or errors associated with PMD of the transmitted optical subcarriers. Each of PMDEQ circuits may supply 725 supplies a first output to a respective one of IFFT components or circuits 730-0-1 to 730-7-1 and a second output to a respective one of IFFT components or circuits 730-0-2 to 730-7-2, each of which may convert a 256 element vector, in this example, back to the time domain as 256 samples in accordance with, for example, an inverse fast Fourier transform (IFFT).

Time domain signals or data output from IFFT 730-0-1 to 730-7-1 are supplied to a corresponding one of Xpol carrier phase correction circuits 740-1-1 to 740-7-1, which may apply carrier recovery techniques to compensate for X polarization transmitter (e.g., laser 408) and receiver (e.g., local oscillator laser 610) linewidths. In some implementations, each carrier phase correction circuit 740-1-1 to 740-7-1 may compensate or correct for frequency and/or phase differences between the X polarization of the transmit signal and the X polarization of light from the local oscillator 600 based on an output of Xpol carrier recovery circuit 740-0-1, which performs carrier recovery in connection with one of the subcarrier based on the outputs of IFFT 730-01. After such X polarization carrier phase correction, the data associated with the X polarization component may be represented as symbols having the complex representation XI+j*XQ in a constellation, such as a QPSK constellation, a BPSK constellation, or a constellation associated with another modulation formation, such as an m-quadrature amplitude modulation (QAM), m being an integer. In some implementations, the taps of the FIR filter included in one or more of PMDEQ circuits 725 may be updated based on the output of at least one of carrier phase correction circuits 740-0-1 to 740-7-01.

In a similar manner, time domain signals or data output from IFFT 730-0-2 to 730-7-2 are supplied to a corresponding one of Ypol carrier phase correction circuits 740-0-2 to 740-7-2, which may compensate or correct for Y polarization transmitter (e.g., laser 408) and receiver (e.g., local oscillator laser 610) linewidths. In some implementations, each carrier phase correction circuit 740-0-2 to 740-7-2 may also corrector or compensate or correct for frequency and/or phase differences between the Y polarization of the transmit signal and the Y polarization of light from the local oscillator 610. After such Y polarization carrier phase correction, the data associated with the Y polarization component may be represented as symbols having the complex representation YI+j*YQ in a constellation, such as a QPSK constellation, a BPSK constellation, or a constellation associated with another modulation formation, such as an m-quadrature amplitude modulation (QAM), m being an integer. In some implementations, the output of one of circuits 740-0-2 to 740-7-2 may be used to update the taps of the FIR filter included in one or more of PMDEQ circuits 725 instead of or in addition to the output of at least one of the carrier recovery circuits 740-0-1 to 740-7-1.

As further shown in FIG. 7, the output of carrier recovery circuits, e.g., carrier recovery circuit 740-0-1, may also be supplied to carrier phase correction circuits 740-1-1 to 740-7-1 and 740-0-2 to 740-7-2 whereby the phase correction circuits may determine or calculate a corrected carrier phase associated with each of the received subcarriers based on one of the recovered carriers, instead of providing multiple carrier recovery circuits, each of which being associated with a corresponding subcarrier.

Each of the symbols to bits circuits or components 745-0-1 to 745-7-1 may receive the symbols output from a corresponding one of circuits 740-0-1 to 740-7-1 and map the symbols back to bits. For example, each of the symbol to bits components 745-0-1 to 745-7-1 may map one X polarization symbol, in a QPSK or m-QAM constellation, to Z bits, where Z is an integer. For dual-polarization QPSK modulated subcarriers, Z is four. Bits output from each of component 745-0-1 to 745-7-1 are provided to a corresponding one of FEC decoder circuits 760-0 to 760-7.

Y polarization symbols are output form a respective one of circuits 740-0-2 to 740-7-2, each of which having the complex representation YI+j*YQ associated with data carried by the Y polarization component. Each Y polarization, like the X polarization symbols noted above, may be provided to symbols to a corresponding one of bit to symbol circuits or components 745-0-2 to 745-7-2, each of which having a similar structure and operating a similar manner as symbols to bits component 745-0-1 to 745-7-1. Each of circuits 745-0-2 to 745-7-2 may provide an output to a corresponding one of FEC decoder circuits 760-0 to 760-7.

Each of FEC decoder circuits 760 may remove errors in the outputs of symbol to bit circuits 745 using forward error correction. Such error corrected bits may be supplied as a corresponding one of outputs D0 to D7.

While FIG. 7 shows DSP 650 as including a particular quantity and arrangement of functional components, in some implementations, DSP 650 may include additional functional components, fewer functional components, different functional components, or differently arranged functional components.

Figure 8:
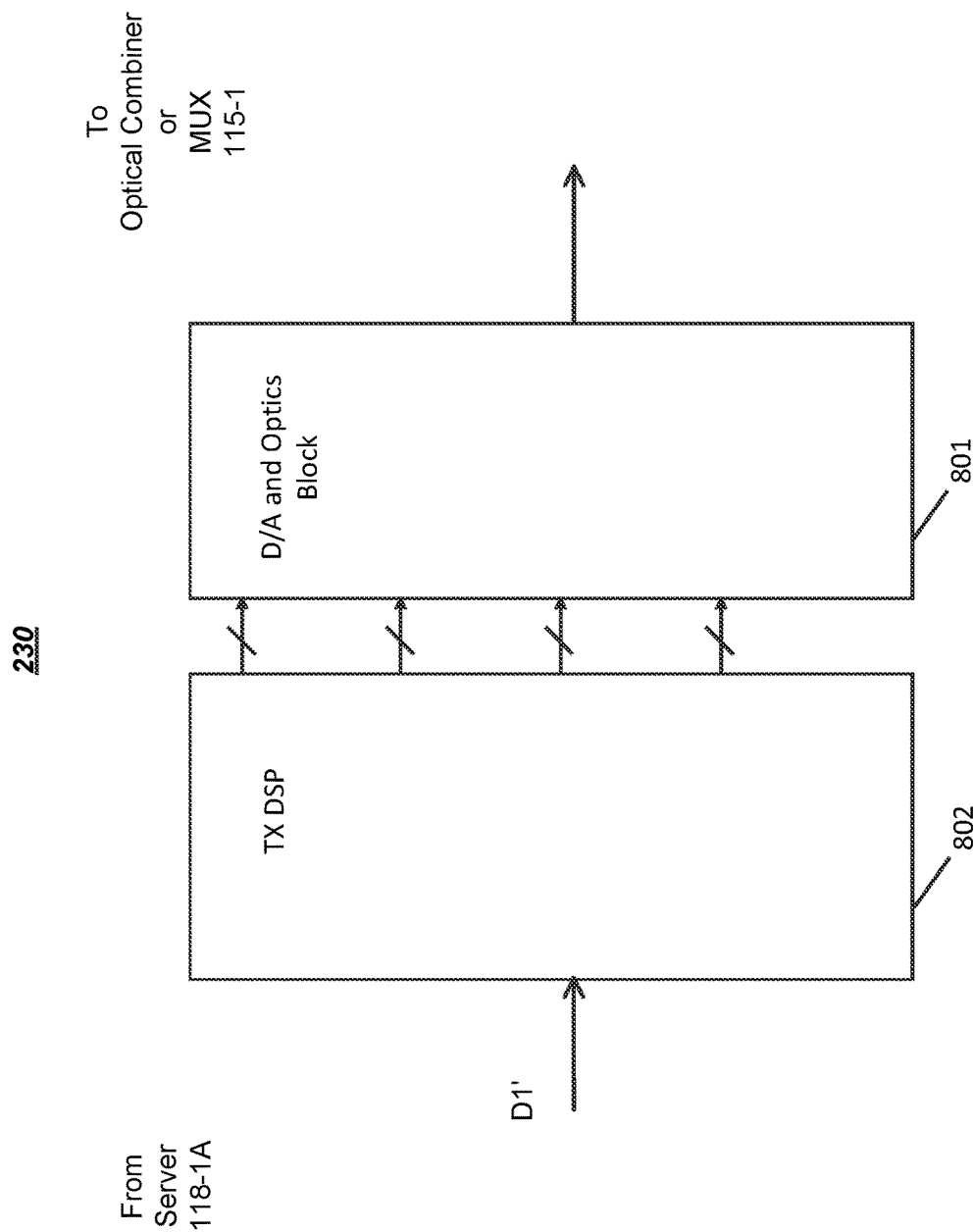
FIG. 8 illustrates an example of a transmitter of a secondary transceiver.

FIG. 8 illustrates an example transmitter 230 of the secondary transceiver 116-1A consistent with the present disclosure. The transmitter 230 may include a digital signal processor (DSP) 802 and a D/A and optics block 801. The construction and operation of the DSP 802 is similar to the construction and operation of the DSP 402. The construction and operation of the D/A and optics block 801 is similar to the construction and operation of the D/A and optics block 401. In this example, the DSP 802 receives one of a plurality of data channels from a server. Based on the one of the plurality of data channels, DSP 802 may supply an output to D/A and optics block 801, which converts the digital signal received from DSP 802 into a corresponding one of a plurality of analog RF signals. D/A and optics block 801 may also adjust the voltages or other characteristics of the analog RF signals to provide drive signals to a corresponding optical modulator. The D/A and optics block 801 may output a carrier signal with data modulated onto a single carrier. The D/A and optics block 801 may output the carrier signal to the optical platform for aggregation with additional carrier signals and delivery to upstream components of the optical network.

Figure 9:
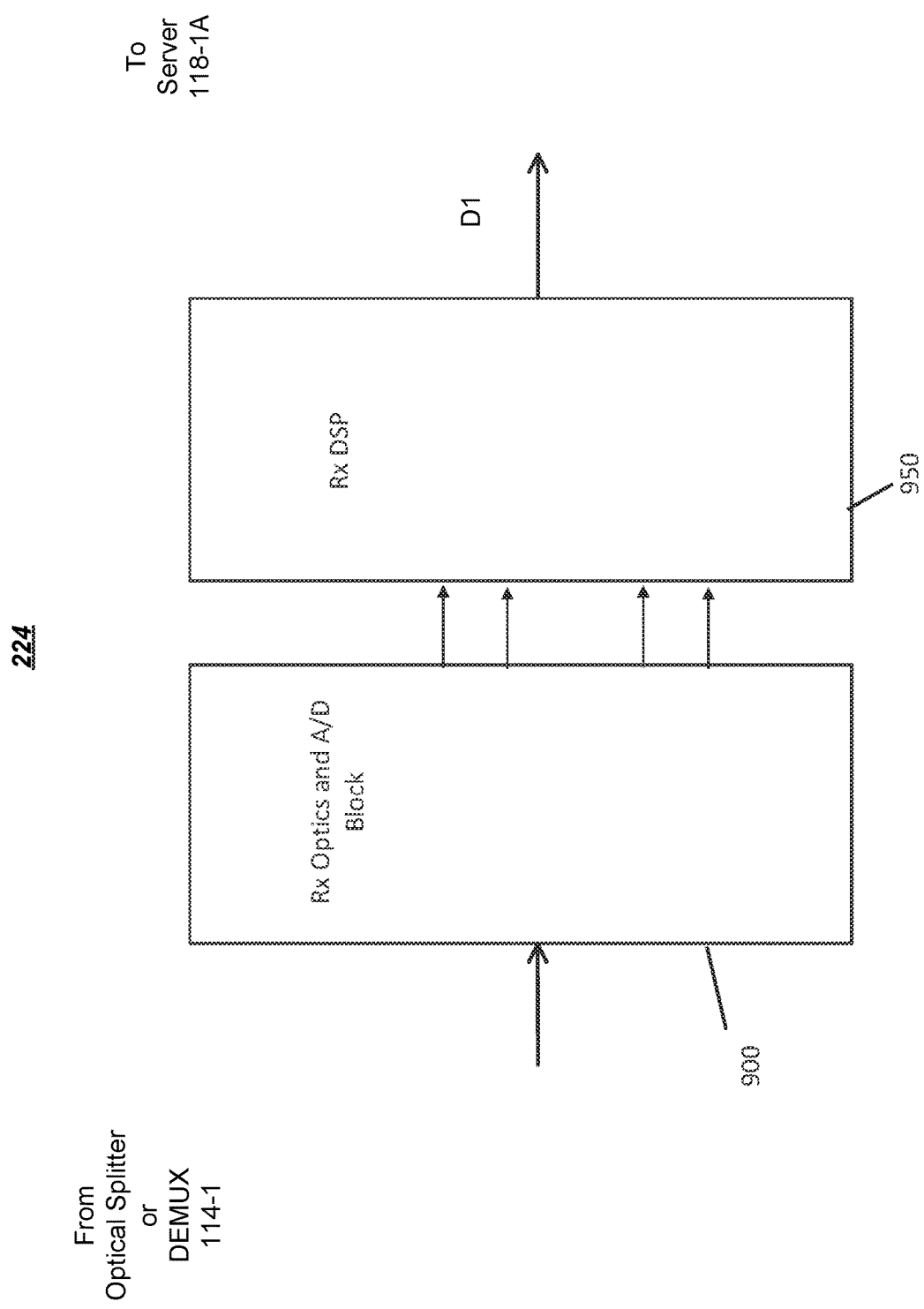
FIG. 9 illustrates an example of a receiver of a secondary transceiver.

FIG. 9 illustrates an example of a receiver 224 of a secondary transceiver 116-1A. The receiver 224 may include an optics and A/D block 900. Optical receiver 224 may also include a processor circuit, e.g., RX DSP 950, which, in conjunction with the RX optics and A/D block 900, may carry out coherent detection. The construction and operation of the DSP 950 is similar to the construction and operation of the DSP 650. The construction and operation of the optics and A/D block 900 is similar to the construction and operation of the optics and A/D block 600. In this example, the receiver 224 receives an output including subcarriers SC0 to SC7. For example, the receiver 224 may receive the output from the optical platform 112-1.

In order to demodulate subcarriers SC0 to SC7, the local oscillator of the optics and A/D block 900 may be tuned to output light having a wavelength or frequency relatively close to one or more of the desired subcarrier wavelengths or frequencies to thereby cause a beating between the local oscillator light and the subcarriers. The local oscillator may also be, for example, an electrical local oscillator. The RX optics and A/D block 900 may include a frequency control circuit, e.g., the frequency control circuit 607. The frequency control circuit 607 may be coupled to the local oscillator laser, e.g., the local oscillator 610, to control the frequency of light output from the local oscillator laser 610. The local oscillator may be tuned to output light having a wavelength or frequency that corresponds to a specific subcarrier with a corresponding server. For example, subcarrier SC0 may be associated with server 118-1A. Thus, the local oscillator of the receiver 224 may be tuned to output light having a frequency close to the subcarrier frequency f0 of subcarrier SC0.

The RX optics and A/D block 900 may include a photodetector circuit that may include the detectors, capacitors, TIA/AGCs, and ADCs. For example, the photodetector circuit may include the detectors 630, capacitors 632, TIA/AGCs 634, and ADCs 640. The photodetector circuit may receive a portion of the light output from the local oscillator laser 610 and a portion of the plurality of outputs of the optical platform 112-1. The processor circuit, e.g., RX DSP 950, may supply one of the plurality of data channels based on a frequency of the light output from the local oscillator. For example, The RX DSP 950 may supply D0 to the server 118-1A based on the frequency f0 output from the local oscillator.

In some examples, the optics and A/D block can include one of a plurality of optical filters, e.g., the optical filter 602. The optical filter 602 may be, for example, a Fabry-Perot interferometer (FPI). The optical filter 602 may select a respective one of the plurality of optical subcarriers. For example, the optical filter 602 may isolate a subcarrier by allowing the portion of the output that is within a specified frequency range of the subcarrier to pass through the optical filter 602, while reflecting the other portions of the output. For example, if SC0 is associated with the server 118-1A, the optical filter 602 may select the frequencies within the frequency range of SC0, and allow those frequencies to pass through the optical filter 602, while reflecting the frequencies outside of the frequency range of SC0.

In some implementations, the receiver 224 may isolate the subcarrier channel associated with the server using an electronic filter circuit. An electronic filter circuit may be a FIR filter, e.g., a FIR filter within each of CDEQ circuits 712-2-0 to 712-7. The FIR filter may correct, offset, or reduces the effects of, or errors associated with chromatic dispersion of the transmitted optical subcarriers. The FIR filter may also be configured to allow the portion of the output within the appropriate subcarrier frequency range to pass, while attenuating the portions of the output that are not within the appropriate subcarrier frequency ranges. The RX DSP 950 may then supply the corresponding data channels to the server.

Figure 10:
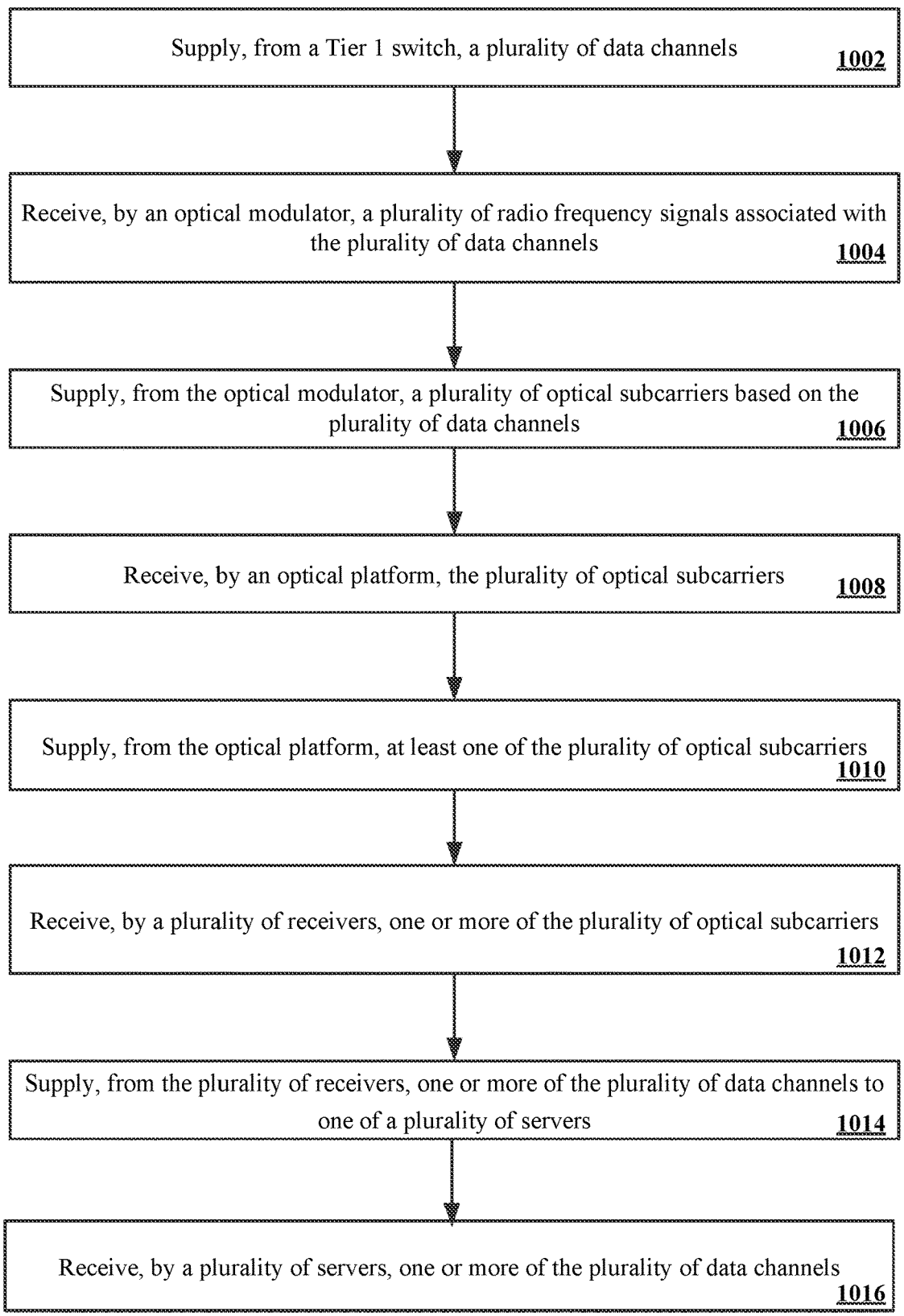
FIG. 10 is a flow diagram that illustrates an example of a process for transmitting an optical signal downstream from a Tier 1 switch to a server.

FIG. 10 is a flow diagram that illustrates an example of a process 1000 for transmitting an optical signal downstream from a Tier 1 switch to a server.

Generally, the process 1000 includes supplying a plurality of data channels from a Tier 1 switch (1002), receiving, by an optical modulator, a plurality of RF signals associated with the plurality of data channels (1004), supplying, from the optical modulator, a plurality of optical subcarriers based on the plurality of data channels (1006), receiving, by an optical platform, the plurality of optical subcarriers (1008), supplying, from the optical platform, at least one of the plurality of subcarriers (1010), receiving, by a plurality of receivers, one or more of the plurality of optical subcarriers (1012), supplying, from the plurality of receivers, one or more of the plurality of data channels to one of a plurality of servers (1014), and receiving, by a plurality of servers, one or more of the plurality of data channels (1016).

During 1002, a Tier 1 switch supplies a plurality of data channels to a primary transceiver. The Tier 1 switch can be, for example, the Tier 1 switch 102. The primary transceiver can be, for example, primary transceiver 110-1. The data channels can be, for example, the data channels D1 to DM. The primary transceiver may receive the data channels from the Tier 1 switch through an I/O port.

During 1004, an optical modulator receives a plurality of RF signals associated with the plurality of data channels. The optical modulator modulates the RF signals associated with the plurality of data channels onto one or more subcarriers. Each of the subcarriers may be associated with a specific server.

During 1006, the optical modulator supplies a plurality of optical subcarriers based on the plurality of data channels. The optical subcarriers can be, for example, the subcarriers SC1 to SCM. The number M of subcarriers may correspond to the number of destination servers. The bandwidth of each subcarrier may be 1/M times the bandwidth of the plurality of optical sub carriers.

During 1008, an optical platform receives the plurality of optical subcarriers. The optical platform can be, for example, the optical platform 112-1. The optical platform may receive the plurality of optical subcarriers via one or more optical fibers.

During 1010, the optical platform supplies at least one of the plurality of optical subcarriers. The optical platform may supply the at least one of the plurality of optical subcarriers using an optical splitter or demultiplexer, for example, the optical splitter 114-1.

During 1012, a plurality of receivers receives one or more of the plurality of optical subcarriers. The one or more of the plurality of optical subcarriers may be, for example, the outputs 120-1A to 120-1M. The plurality of receivers can be, for example, the receivers 224 of the secondary transceivers 116-1A to 116-1M. The plurality of receivers can receive the plurality of optical subcarriers through one or more optical fibers.

During 1014, the plurality of receivers supplies one or more of the plurality of data channels to one of a plurality of servers. The plurality of receivers may supply, from the plurality of data channels, the data channels associated with a server.

During 1016, the plurality of servers receives one or more of the plurality of data channels. The one or more of the plurality of data channels can be, for example, the data channel D1. The plurality of servers may be, for example, the servers 118-1A to 118-1M.

Figure 11:
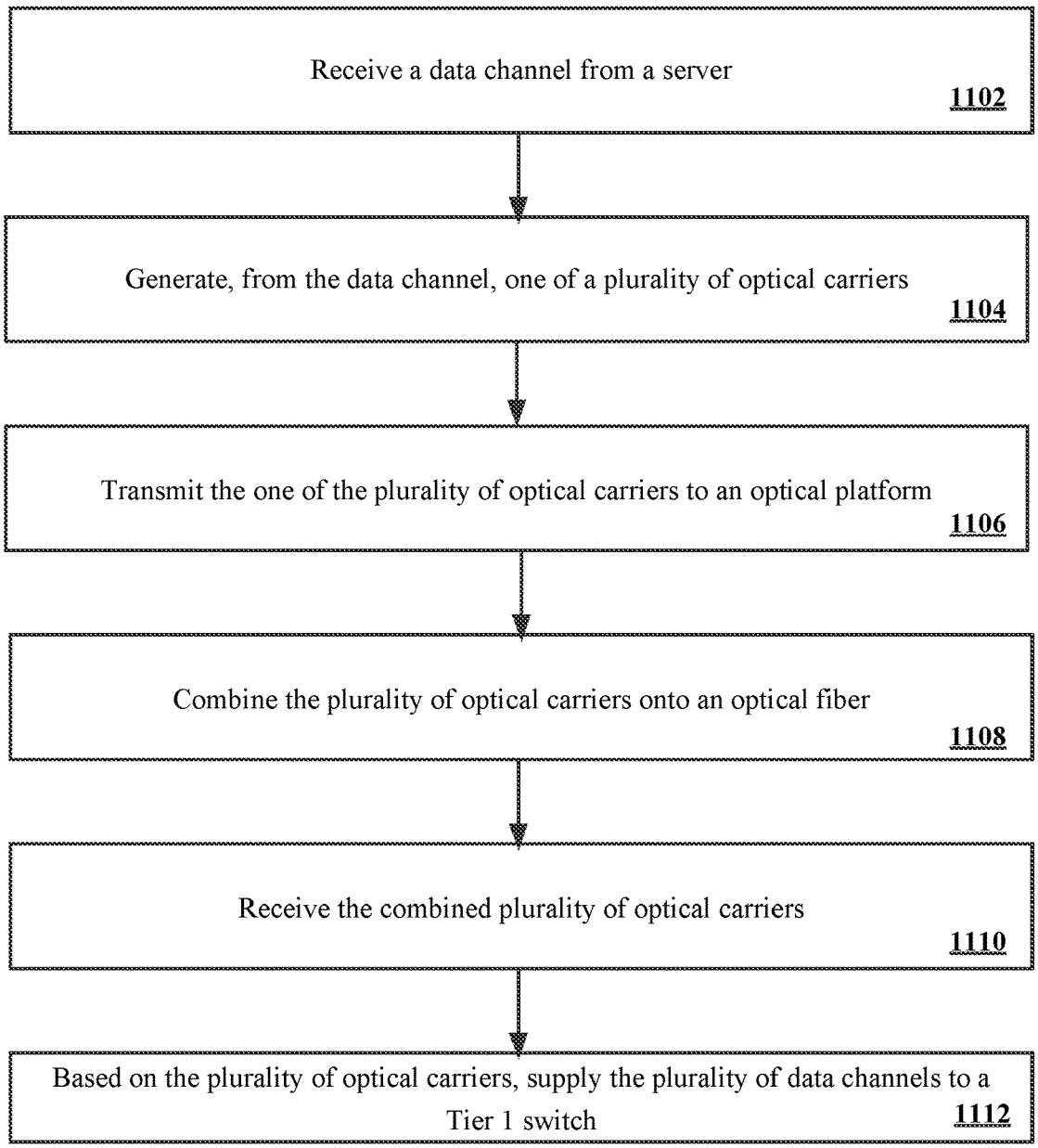
FIG. 11 is a flow diagram that illustrates an example of a process for transmitting an optical signal upstream from a server to a Tier 1 switch.

FIG. 11 is a flow diagram that illustrates an example of a process 1100 for transmitting an optical signal upstream from a server to Tier 1 switch.

Generally, the process 1100 includes receiving a data channel from a server (1102), generating one of a plurality of optical carriers (1104), transmitting the one of the plurality of optical carriers to an optical platform (1106), combining the plurality of optical carriers onto an optical fiber (1108), receiving the combined plurality of optical carriers (1110), and, based on the plurality of optical carriers, supplying the plurality of data channels to a Tier 1 switch (1112).

During 1102, a secondary transceiver receives a data channel from a server. The server can be, for example, the server 118-1A. The secondary transceiver can be, for example, the secondary transceiver 116-1A. The data channel can be, for example, the data channel D1'.

During 1104, the secondary transceiver generates one of a plurality of optical carriers from the data channel. The one of a plurality of optical carriers can be, for example, one of the carrier signals 122-1A to 122-1M.

During 1106, the secondary transceiver transmits the one of a plurality of optical carriers to an optical platform. The optical platform can be, for example, the optical platform 112-1. The secondary transceiver can transmit the one of a plurality of optical carriers to the optical platform via one or more optical fibers.

During 1108, the optical platform combines the plurality of optical carriers onto an optical fiber. The optical platform can combine the plurality of optical carriers using, for example, the optical power combiner or multiplexer 115-1. The combined plurality of optical carriers can be, for example, the combined plurality of optical carriers 124-1.

During 1110, the primary transceiver receives the combined plurality of optical carriers. The primary transceiver demodulates the optical carriers, from the composite carrier signal.

During 1114, the primary transceiver outputs the data channels to a Tier 1 switch. The Tier 1 switch can be, for example, the Tier 1 switch 102. The data channels can be, for example, the data channels D1' to DM'. The primary transceiver can output the data channels to the Tier 1 switch through an I/O port.

Embodiments of the disclosure and all of the functional operations described in this specification may be implemented in digital electronic circuitry, or in computer software, firmware, or hardware, including the structures disclosed in this specification and their structural equivalents, or in combinations of one or more of them. Embodiments of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the disclosure may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the disclosure may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the disclosure, or any combination of one or more such back end, middleware, or front end components. The components of the system may be interconnected by any form or medium of data channels communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
a Tier 1 switch that supplies a plurality of data channels;
a first transmitter that receives the plurality of data channels, the transmitter including:
a laser, and
an optical modulator that receives a plurality of radio frequency (RF) signals associated with the plurality of data channels, such that the optical modulator supplies a plurality of optical subcarriers based on the plurality of data channels;
an optical platform, including one of an optical demultiplexer or a splitter, that receives the plurality of optical subcarriers, the optical platform having a plurality of outputs, each of which supplying at least one of the plurality of subcarriers;
a plurality of receivers, each of which being coupled to a respective one of the plurality of outputs of the optical platform, each of the plurality of receivers receiving one or more of the plurality of optical subcarriers and supplying one or more of the plurality of data channels based on the received one or more of the plurality subcarriers;
a plurality of servers, each of which receiving one or more of the plurality of data channels from one or more of the plurality of receivers;
a plurality of second transmitters, each of which being coupled to a respective one of the plurality of servers, each of the plurality of second transmitters providing a respective one of a plurality of Nyquist subcarriers, such that each of the plurality of Nyquist subcarriers do not spectrally overlap with one another; and
an optical combiner operable to combine the plurality of Nyquist subcarriers onto an optical fiber, which directs the plurality of Nyquist subcarriers to the Tier 1 switch.

2. A system in accordance with claim 1, wherein the optical platform includes an optical demultiplexer that supplies a corresponding one or more of the plurality of subcarriers at each of the plurality of outputs.

3. A system in accordance with claim 1, wherein the optical platform includes an optical splitter that supplies a copy of the plurality of subcarriers at each of the plurality of outputs.

4. A system in accordance with claim 1, wherein each of the plurality of data channels supplied to the transmitter constitutes a respective one of a plurality of electrical signals.

5. A system in accordance with claim 1, wherein the Tier 1 switch includes a housing, the housing including the transmitter.

6. A system in accordance with claim 1, wherein each of plurality of optical subcarriers is modulated in accordance with a modulation format, the modulation format being selected from an m-quadrature amplitude modulation (QAM), m being an integer, quadrature phase shift keying (QPSK), and binary phase shift keying (BPSK).

7. A system in accordance with claim 1, wherein each of the plurality of receivers includes a respective one of a plurality of local oscillator lasers.

8. A system in accordance with claim 1, wherein one of the plurality of receivers includes:
- a local oscillator laser;
- a control circuit, the control circuit being coupled to the local oscillator laser to thereby control a frequency of light output from the local oscillator laser;
- a photodetector circuit configured to receive at least a portion of the light output from the local oscillator laser and at least part of one of the plurality of outputs of the optical platform; and
- a processor circuit that supplies one of the plurality of data channels based on an output of the photodetector circuit.

9. A system in accordance with claim 8, wherein the processor supplies said one of the plurality of data channels further based on a frequency of the light output from the local oscillator.

10. A system in accordance with claim 8, wherein the processor circuit includes a filter circuit, the processor circuit supplying said one of the plurality of data channels based on an output of the filter circuit.

11. A system in accordance with claim 1, wherein each of the plurality of receivers includes a corresponding one of a plurality of optical filters, each of the plurality of optical filters being configured to select a respective one of the plurality of optical subcarriers.

12. A system, comprising:
- a plurality of servers, each of which supplying a corresponding one of a plurality of data channels;
- a plurality of transmitters, each of which receiving a corresponding one of the plurality of data channels, each of the plurality of transmitters providing a respective one of a plurality of optical Nyquist sub-carriers, each of the plurality of optical Nyquist sub-carriers being modulated in accordance with a respective one of a plurality of radio frequency (RF) signals each RF signal being based on a respective one of the plurality of data channels;
- an optical platform including an optical combiner that combines the plurality of optical Nyquist sub-carriers onto an optical fiber, such that each of the plurality of optical Nyquist sub-carriers do not spectrally overlap with one another;
- a receiver that receives the combined plurality of optical Nyquist sub-carriers, the receiver including a local oscillator, such that based on the plurality of optical carriers and an output of the local oscillator, the receiver supplies the plurality of data channels; and
- a Tier 1 switch that receives the plurality of data channels.

13. A system in accordance with claim 12, wherein the optical combiner is an optical power combiner.

14. A system in accordance with claim 12, wherein the optical combiner is an optical multiplexer.

15. A system in accordance with claim 12, wherein the optical combiner is an arrayed waveguide grating.

16. A system in accordance with claim 12, wherein each of the plurality of data channels constitutes a respective one of a plurality of electrical signals.

17. A system in accordance with claim 12, wherein the Tier 1 switch includes a housing, the housing including the receiver.

18. A system in accordance with claim 12, wherein each of plurality of optical carriers is modulated in accordance with a modulation format, the modulation format being selected from an m-quadrature amplitude modulation (QAM), m being an integer, quadrature phase shift keying (QPSK), and binary phase shift keying (BPSK).

19. A system in accordance with claim 12, wherein the local oscillator includes a local oscillator laser.

\* \* \* \* \*